US008131808B2

(12) United States Patent  (10) Patent No.: US 8,131,808 B2
Aoki et al.  (45) Date of Patent: Mar. 6, 2012

(54) APPARATUS AND METHOD FOR DETECTING CHARACTERISTICS OF ELECTRONIC MAIL MESSAGE

(75) Inventors: Kazuo Aoki, Tagata-gun (JP); Masahiko Maedera, Niiza (JP); Nobumitsu Matoba, Machida (JP)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 12/187,033

(22) Filed: Aug. 6, 2008

(65) Prior Publication Data

US 2009/0043860 A1 Feb. 12, 2009

(30) Foreign Application Priority Data

Aug. 10, 2007 (JP) ................... 2007-209389

(51) Int. Cl.
*G06F 15/16* (2006.01)
(52) U.S. Cl. ............ 709/206; 726/24; 709/224
(58) Field of Classification Search .......... 709/206
See application file for complete search history.

(56) References Cited

U.S. PATENT DOCUMENTS

| | | | | |
|---|---|---|---|---|
| 5,636,345 A * | 6/1997 | Valdevit | | 709/224 |
| 7,206,814 B2 * | 4/2007 | Kirsch | | 709/206 |
| 7,299,261 B1 * | 11/2007 | Oliver et al. | | 709/206 |
| 7,406,502 B1 * | 7/2008 | Oliver et al. | | 709/206 |
| 7,673,344 B1 * | 3/2010 | Rowney et al. | | 726/26 |
| 7,711,779 B2 * | 5/2010 | Goodman et al. | | 709/206 |
| 7,886,359 B2 * | 2/2011 | Jones et al. | | 726/26 |
| 7,889,888 B2 * | 2/2011 | Deardorff et al. | | 382/113 |
| 2003/0084300 A1 * | 5/2003 | Koike | | 713/182 |
| 2003/0088520 A1 * | 5/2003 | Bohrer et al. | | 705/74 |
| 2003/0172292 A1 * | 9/2003 | Judge | | 713/200 |
| 2004/0103310 A1 * | 5/2004 | Sobel et al. | | 713/201 |
| 2004/0125798 A1 * | 7/2004 | Hondo et al. | | 370/389 |
| 2004/0177120 A1 * | 9/2004 | Kirsch | | 709/206 |
| 2004/0205661 A1 * | 10/2004 | Gallemore | | 715/530 |
| 2005/0021649 A1 * | 1/2005 | Goodman et al. | | 709/207 |
| 2005/0076233 A1 * | 4/2005 | Aarts et al. | | 713/201 |
| 2005/0182765 A1 * | 8/2005 | Liddy | | 707/5 |
| 2005/0240617 A1 * | 10/2005 | Lund et al. | | 707/102 |
| 2006/0085504 A1 * | 4/2006 | Yang et al. | | 709/206 |
| 2006/0136985 A1 * | 6/2006 | Ashley et al. | | 726/1 |

(Continued)

FOREIGN PATENT DOCUMENTS

JP  2002-290469  10/2002

(Continued)

*Primary Examiner* — Firmin Backer
*Assistant Examiner* — Hamza Algibhah
(74) *Attorney, Agent, or Firm* — Patents on Demand, P.A.; Brian K. Buchheit; Scott M Garret

(57) ABSTRACT

The present invention enables accurate detection of risks from an electronic mail message. In a mail inspection unit, an information extraction section extracts text and a mail address from electronic mail accumulated in a journal DB, and a text normalization section normalizes the text. A sort-information saving section generates text sort information according to the score obtained from a sorting engine, and stores it in a mail-management-information storage section. A personal-information saving section extracts personal information from a personal-information storage section according to the mail address, and stores it in the mail-management-information storage section. Finally, a risk-level determination section compares the information stored in the mail-management-information storage section with the information stored in a category-information storage section to determine the risk level of the electronic mail.

17 Claims, 13 Drawing Sheets

U.S. PATENT DOCUMENTS

| | | | |
|---|---|---|---|
| 2006/0174341 A1* | 8/2006 | Judge | 726/22 |
| 2006/0217136 A1* | 9/2006 | Bantukul et al. | 455/466 |
| 2006/0265747 A1* | 11/2006 | Judge | 726/22 |
| 2007/0086592 A1* | 4/2007 | Ellison et al. | 380/282 |
| 2007/0143407 A1* | 6/2007 | Avritch et al. | 709/206 |
| 2007/0219893 A1* | 9/2007 | Xu | 705/36 R |
| 2007/0220143 A1* | 9/2007 | Lund et al. | 709/224 |
| 2007/0283410 A1* | 12/2007 | Hsu | 726/1 |
| 2007/0299923 A1* | 12/2007 | Skelly et al. | 709/206 |
| 2007/0300286 A1* | 12/2007 | Judge | 726/1 |
| 2008/0114843 A1* | 5/2008 | Shinde et al. | 709/206 |
| 2008/0133676 A1* | 6/2008 | Choisser et al. | 709/206 |
| 2008/0177846 A1* | 7/2008 | Feng | 709/206 |
| 2008/0301245 A1* | 12/2008 | Estrada et al. | 709/206 |
| 2010/0077480 A1* | 3/2010 | Yoo | 726/24 |

FOREIGN PATENT DOCUMENTS

WO　　WO 2008094161 A1 * 8/2008

* cited by examiner

| SUBDIVIDED SORT CRITERIA | | PERSONAL INFORMATION (DEPARTMENT) | NECESSARY MEASURES |
|---|---|---|---|
| NON-PRIVATE/PRIVATE | PURCHASE | | |
| NON-PRIVATE MAIL | ESTIMATE/ ORDER MAIL | SENT FROM PURCHASE DEPARTMENT | NO PROBLEM (PROPER) |
| NON-PRIVATE MAIL | ESTIMATE/ ORDER MAIL | SENT FROM DEPARTMENT OTHER THAN PURCHASE DEPARTMENT | BREACH OF AUTHORIZED PURCHASE (BREACH OF COMPLIANCE) (IMMEDIATE INSPECTION) |
| NON-PRIVATE MAIL | ESTIMATE/ ORDER MAIL | NA | PRIVATE PURCHASE USING CORPORATE MAIL ID (RISK OF DENTING COMPANY'S IMAGE DEPENDING ON CONTENT AND CIRCUMSTANCE OF PURCHASE (IMMEDIATE INSPECTION) |
| NON-PRIVATE MAIL | OTHER | NA | ETHICAL ISSUE AGAINST CORPORATE RULES (WARNING) |

FIG. 3A

| SUBDIVIDED SORT CRITERIA | | PERSONAL INFORMATION | | NECESSARY MEASURES |
| --- | --- | --- | --- | --- |
| NON-PRIVATE/PRIVATE | PURCHASE | POSITION | SEX | |
| NON-PRIVATE MAIL | INDECENCY, BLACKMAIL, THREAT, SEXUAL WORDS | SENDER IS HIGHER THAN ADDRESSEE IN POSITION #1 | NA | POWER HARASSMENT (IMMEDIATE INSPECTION) |
| NON-PRIVATE MAIL | INDECENCY, BLACKMAIL, THREAT, SEXUAL WORDS | NA | SENDER AND ADDRESSEE ARE DIFFERENT IN SEX #2 | SEXUAL HARASSMENT OR STALKING (IMMEDIATE INSPECTION) |
| NON-PRIVATE MAIL | INDECENCY, BLACKMAIL, THREAT, SEXUAL WORDS | OTHER THAN #1 | OTHER THAN #2 | ETHICAL ISSUE (WARNING) |
| NON-PRIVATE MAIL | INDECENCY, BLACKMAIL, THREAT, SEXUAL WORDS | NA | NA | ETHICAL ISSUE (WARNING) |
| NON-PRIVATE MAIL | OTHER | NA | NA | ETHICAL ISSUE AGAINST CORPORATE RULES (WARNING) |

FIG. 3B

| PURPOSE OF SORTING | SENDER | TIMING | KNOWLEDGE BASE | PERSONAL INFORMATION |
|---|---|---|---|---|
| TO DETECT BREACH OF PURCHASE COMPLIANCE | • BLACK LIST<br>• PURCHASE | • DAILY | • NON-PRIVATE/PRIVATE<br>• PURCHASE | • DEPARTMENT OF SENDER |
| TO DETECT HARASSMENT | • BLACK LIST<br>• PURCHASE | • WEEKLY | • NON-PRIVATE/PRIVATE<br>• HARASSMENT | • POSITION OF SENDER<br>• POSITION OF ADDRESSEE<br>• SEX OF SENDER<br>• SEX OF ADDRESSEE |

FIG. 4

| MAIL ADDRESS | DEPARTMENT | POSITION | SEX | WARNING QUANTITY | BLACK LIST |
|---|---|---|---|---|---|
| aaaaa@xxx.co.jp | PURCHASE | DIRECTOR | MALE | 0 | OFF |
| bbbbb@xxx.co.jp | SALES | MANAGER | FEMALE | 0 | OFF |
| ccccc@xxx.co.jp | LEGAL | SUPERVISOR | MALE | 0 | ON |
| ddddd@xxx.co.jp | PURCHASE | REGULAR EMPLOYEE | FEMALE | 1 | OFF |
| eeeee@xxx.co.jp | DEVELOPMENT | REGULAR EMPLOYEE | MALE | 1 | OFF |

FIG. 5

| | | |
|---|---|---|
| MR. MATOBA, INDISPENSABLE PROPOSAL ITEMS... | PURCHASE (99.60) | NO PURCHASE (0.26) |
| MR. OGASAWARA, DP404X MAINTENANCE CONTRACT UPDATE: <2... | PURCHASE (99.43) | NO PURCHASE (0.31) |
| [XXXXX] REQUEST FOR AGREEMENT WITH CONSIDERATION OF ESTIMATES (SCORE)... | PURCHASE (99.42) | NO PURCHASE (0.31) |
| [XXXXX] REQUEST FOR FINAL CONFIRMATION ON ESTIMATES... | PURCHASE (99.06) | NO PURCHASE (0.36) |
| MR. MATSUDA, ESTIMATES FOR MR. XX... | PURCHASE (99.03) | NO PURCHASE (0.40) |

FIG. 7

| MAIL ID | SORT INFORMATION | | | SENDER INFORMATION | | | ADDRESSEE INFORMATION | | |
|---|---|---|---|---|---|---|---|---|---|
| | NON-PRIVATE/PRIVATE | PURCHASE | HARASSMENT | DEPARTMENT | POSITION | SEX | DEPARTMENT | POSITION | SEX |
| ... | ... | ... | ... | ... | ... | ... | ... | ... | ... |
| aaaaa000336699 | NON-PRIVATE | PURCHASE | NO HARASSMENT | PURCHASE | DIRECTOR | MALE | | UNSAVED | UNSAVED |
| ccccc001020304 | NON-PRIVATE | NO PURCHASE | NO HARASSMENT | LEGAL | SUPERVISOR | MALE | | MANAGER | FEMALE |
| eeeee000111111 | NON-PRIVATE | NO PURCHASE | NO HARASSMENT | DEVELOPMENT | REGULAR EMPLOYEE | MALE | | REGULAR EMPLOYEE | FEMALE |
| ddddd000987654 | NON-PRIVATE | NO PURCHASE | NO HARASSMENT | PURCHASE | REGULAR EMPLOYEE | FEMALE | | REGULAR EMPLOYEE | MALE |
| ccccc001020305 | NON-PRIVATE | NO PURCHASE | HARASSMENT | LEGAL | SUPERVISOR | MALE | | REGULAR EMPLOYEE | MALE |
| bbbbb002040608 | NON-PRIVATE | NO PURCHASE | NO HARASSMENT | SALES | MANAGER | FEMALE | | DIRECTOR | MALE |
| aaaaa000336700 | NON-PRIVATE | PURCHASE | NO HARASSMENT | PURCHASE | DIRECTOR | MALE | | UNSAVED | UNSAVED |
| ... | ... | ... | ... | ... | ... | ... | ... | ... | ... |

FIG. 8

| PRIVATE MAIL | PURCHASE MAIL | PURCHASE STAFF | MEASURES |
|---|---|---|---|
| A | A | A | WARNING |
| A | A | NA | WARNING |
| A | NA | A | WARNING |
| A | NA | NA | WARNING |
| NA | A | A | NO PROBLEM |
| NA | A | NA | IMMEDIATE INSPECTION |
| NA | NA | A | NO PROBLEM |
| NA | NA | NA | NO PROBLEM |

FIG. 9A

| PRIVATE MAIL | HARASSMENT MAIL | SENDER POSITION > ADDRESSEE POSITION | SENDER SEX ≠ ADDRESSEE SEX | MEASURES |
|---|---|---|---|---|
| A | A | A | A | WARNING |
| A | A | A | NA | WARNING |
| A | A | NA | A | WARNING |
| A | A | NA | NA | WARNING |
| A | NA | A | A | WARNING |
| A | NA | A | NA | WARNING |
| A | NA | NA | A | WARNING |
| A | NA | NA | NA | WARNING |
| NA | A | A | A | IMMEDIATE INSPECTION |
| NA | A | A | NA | IMMEDIATE INSPECTION |
| NA | A | NA | A | IMMEDIATE INSPECTION |
| NA | A | NA | NA | WARNING |
| NA | NA | A | A | NO PROBLEM |
| NA | NA | A | NA | NO PROBLEM |
| NA | NA | NA | A | NO PROBLEM |
| NA | NA | NA | NA | NO PROBLEM |

FIG. 9B

APPARATUS AND METHOD FOR DETECTING CHARACTERISTICS OF ELECTRONIC MAIL MESSAGE

CROSS-REFERENCE TO RELATED APPLICATIONS

This application claims the benefit of Japanese Patent Application No. 2007-209389 filed 10 Aug. 2007, which is hereby incorporated by reference.

BACKGROUND OF THE INVENTION

The present invention relates to an apparatus and a method for detecting the characteristics of an electronic mail message, and more particularly, it relates to an apparatus and a method for detecting an inspection characteristic in an electronic mail message.

Electronic mail has become the dominant communication means for companies and organizations in recent years. However, there is a high probability that messages exchanged by electronic mail (electronic mail messages) contain various types of information that may create risks for organizations. Examples of such risky information are breaches of compliance and moral.

Therefore, techniques for inspecting electronic mail have been proposed, such as JP2002-290469 entitled "Electronic Mail Auditing System and Its Method". This patent application discloses a technique of sorting electronic mail into at least two kinds according to the compatibility with a search condition formula, indicating the content of the two or more kinds of sorted electronic mail according to the type, and setting the address to a client unit or an external destination computer of the network.

Some characteristics of electronic mail messages upon which a sorting process is based cannot be determined solely from the content of the messages, as taught by JP2002-290469. No known solution addresses this problem, nor has this problem even recognized within any known publication.

BRIEF SUMMARY OF THE INVENTION

The present invention can enable accurate detection of an inspection characteristic in an electronic mail message. More specifically, the invention can be configured to detect the characteristics of an electronic mail message also using the characteristic information of the sender and the addressee of the electronic mail message.

One embodiment of the present invention provides an apparatus for detecting an inspection characteristic in an electronic mail message. The apparatus can include: a first acquisition section for acquiring first characteristic information on the content of the electronic mail message according to the text information of the electronic mail message; a second acquisition section for acquiring second characteristic information on at least one of the sender and the addressee of the electronic mail message according to the address information of the electronic mail message; and a determination section for determining whether the electronic mail message has the inspection characteristic by comparing the first characteristic information acquired by the first acquisition section with a first condition for determining whether the electronic mail message has the inspection characteristic and by comparing the second characteristic information acquired by the second acquisition section with a second condition for determining whether the electronic mail message has the inspection characteristic.

In the apparatus, the first acquisition section and the second acquisition section may store the first characteristic information and the second characteristic information in a memory; and the determination section may determine whether the electronic mail message has the inspection characteristic asynchronously with the storage of the first characteristic information and the second characteristic information into the memory.

The first condition may be a combination of a set of conditions for determining whether the electronic mail message has the inspection characteristic. In the case where the inspection characteristic is a breach of a specific authorized action, the second condition may include a condition regarding the specific authorized action of the sender. In the case where the inspection characteristic is an action toward another person using a relation with the person, the second condition may include a condition regarding the relation between the sender and the addressee.

The apparatus may further include a sorting section for sorting the electronic mail message into one of a set of categories, which are predetermined for the inspection characteristic according to the determination made, by the determination section. The apparatus may further include a saving section for saving, as an attribute of the sender of the electronic mail message, information according to the category into which the electronic mail message is sorted by the sorting section. The apparatus may further include a control section for controlling the apparatus so that at least one of the first acquisition section, the second acquisition section, and the determination section operates according to a schedule that is predefined for the inspection characteristic.

Another embodiment of the present invention can provide a method for detecting an inspection characteristic in an electronic mail message. The method can include the steps of: acquiring first characteristic information on the content of the electronic mail message according to the text information of the electronic mail message; reading personal information including the electronic mail address information of each user and the characteristic information of each user from storage means; acquiring second characteristic information on at least one of the sender and the addressee of the electronic mail message by searching the personal information read from the storage means according to the address information of the electronic mail message; and determining whether the electronic mail message has the inspection characteristic by comparing the first characteristic information with a first condition for determining whether the electronic mail message has the inspection characteristic and by comparing the second characteristic information with a second condition for determining whether the electronic mail message has the inspection characteristic.

Another embodiment of the invention can provide a computer program product having computer usable program code for detecting an inspection characteristic in an electronic mail message. The computer program product can include: computer usable program code for acquiring first characteristic information on the content of the electronic mail message according to the text information of the electronic mail message; computer usable program code for acquiring second characteristic information on at least one of the sender and the addressee of the electronic mail message according to the address information of the electronic mail message; and computer usable program code for associating the first characteristic information acquired by the first acquisition section and the second characteristic information acquired by the second acquisition section with the electronic mail message.

BRIEF DESCRIPTION OF THE SEVERAL VIEWS OF THE DRAWINGS

FIG. 3 is a diagram for describing measures for the risk used as an example of the embodiment of the invention.

FIG. 4 is a diagram of examples of schedule information used in the embodiment of the invention.

FIG. 5 is a diagram of examples of personal information used in the embodiment of the invention.

FIG. 7 is a diagram of examples of information returned from a sorting engine according to the embodiment of the invention.

FIG. 8 is a diagram of an example of mail management information stored in the embodiment of the invention.

FIGS. 9A and 9B are diagrams of examples of category information used in the embodiment of the invention.

DETAILED DESCRIPTION OF THE INVENTION

According to the invention, an accurate inspection characteristic can be accurately detected from an electronic mail message. There has been a demand for detecting various risks in companies from electronic mail messages (hereinafter, simply referred to as email) to prevent such risks. Accordingly, email inspection is performed to find breaches of legal rules and corporate rules in early stages.

Actual company demands for email inspection can vary from company to company. These demands can include a demand for knowing how much unnecessary private mail has been exchanged. A reduction of private mail can decreases loads on servers and the quantity of disks used. Further, private mail can be undesirable because it may bring about the risk of solicitations, purchase, and sale among employees. Additionally, private mail can include malicious code that may infest a corporate computing environment.

Some companies may have a demand for revealing various risks that lurk in companies. For example, purchases made during business hours may have the following risks: Purchase by private mail using company mail ID can dent the company's image, depending on the purchases. Even purchase on business can breach compliance unless authorized to purchase it. There may also be the risk of sexual harassment, power harassment, or stalking among employees. In this specification, harassment using one's position in the workplace is referred to as "power harassment". There may also be the risk of activities not on business, such as those for side business and religion. Furthermore, there may be the risk of activities leading to a breach of compliance. Examples of the breach of compliance are violation of laws such as bribery and bid rigging. These cause losses to companies.

In response to the above demands and others not mentioned, the disclosed solution provides detection of various risks in companies by email inspection. Email inspection benefits are not limited to those relating to the above risks, which are provided by way of example to emphasize a need for the disclosed solution and some contemplated benefits achievable via the invention, which are not achievable using known technologies.

Figure 1:
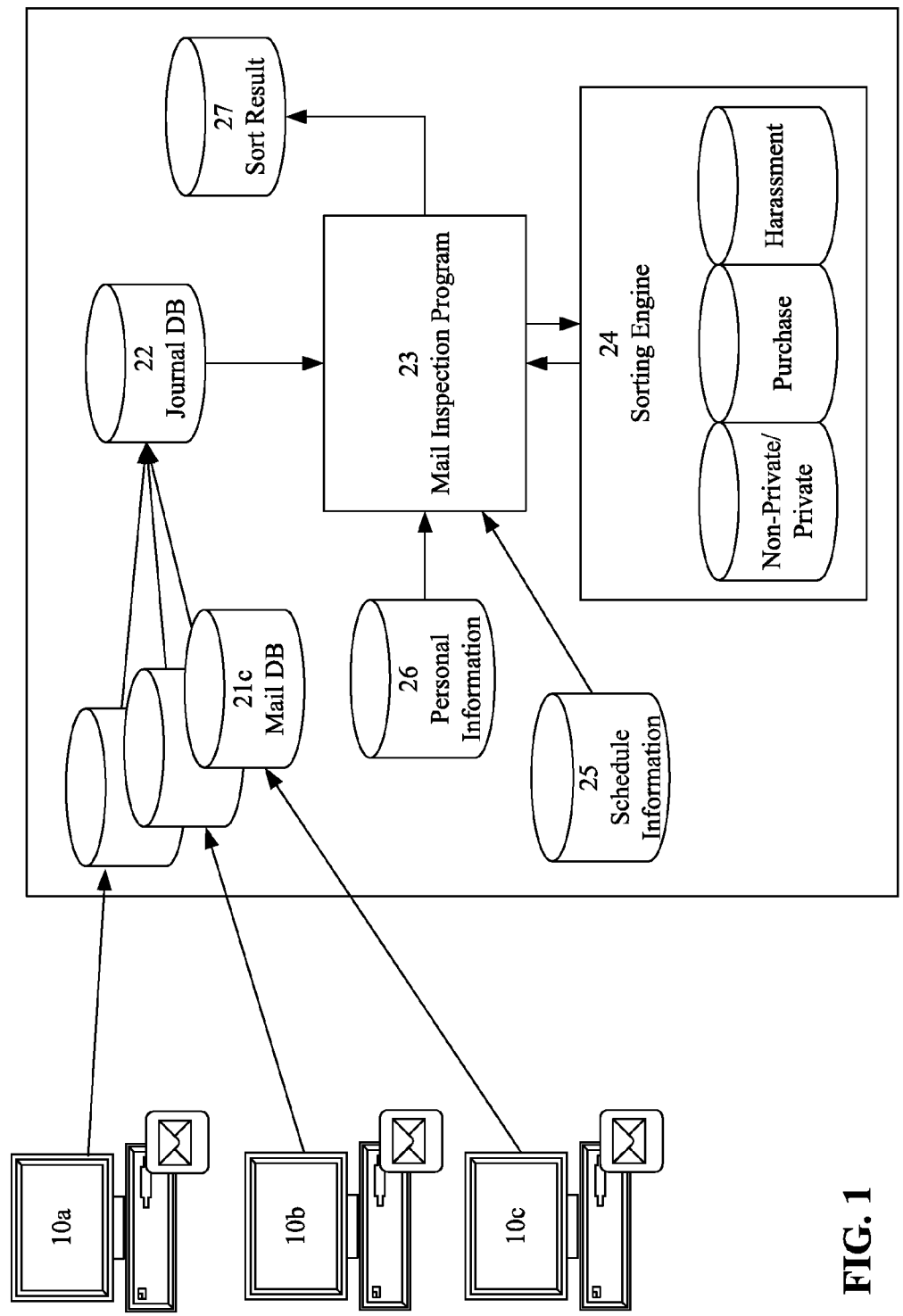
FIG. 1 is a block diagram of a computer system incorporating an embodiment of the invention.

FIG. 1 is a block diagram of the computer system incorporating an embodiment of the present invention. As depicted in the drawing, the computer system includes clients 10a, 10b, and 10c and a mail server 20. The clients 10a, 10b, and 10c are terminals for the user to send email, to each of which one mail address is assigned. The clients 10a, 10b, and 10c can each achieved by a personal computer or any other client computing device. Although FIG. 1 shows only the clients 10a, 10b, and 10c, the number of clients is not limited to three.

The mail server 20 can be a server computer (e.g., SMTP server) which temporarily stores emails sent from the clients 10a, 10b, and 10c in its own network, and sends them to another network. The mail server 20 includes mail databases (mail DBs) 21a, 21b, and 21c, a journal database journal DB) 22, a mail inspection program 23, and a sorting engine 24. The mail server 20 further includes a schedule-information storage section 25, a personal-information storage section 26, and a sort-result storage section 27. The mail DBs 21a, 21b, and 21c are provided for each mail address, and stores emails sent from corresponding mail addresses. Since one mail address is assigned to each of the clients 10a, 10b, and 10c, as described above, the mail DBs 21a, 21b, and 21c are provided for the clients 10a, 10b, and 10c, respectively. The journal DB 22 is a database for integrating the emails stored in the mail DBs 21a, 21b, and 21c, and accumulating them in order of, for example, transmission date and time.

The mail inspection program 23 is a program for reading the emails accumulated in the journal DB 22, and inspecting and sorting them. The mail inspection program 23 is executed according to the information stored in the schedule-information storage section 25 and using the information stored in the personal-information storage section 26. The email sort results by the mail inspection program 23 are output to the sort-result storage section 27.

The sorting engine 24 is an engine that the mail inspection program 23 uses to inspect email. The sorting engine 24 includes knowledge bases 41a, 41b, and 41c, and determines the characteristics of the content of email using the knowledge bases 41a, 41b, and 41c. The mail inspection program 23 can use the sorting engine 24 by calling, for example, an application program interface (API). Which knowledge base is to be used is sent from the mail inspection program 23 to the sorting engine 24 as a parameter.

The knowledge base 41a is a non-private/private knowledge base for determining whether the email is mail on business (hereinafter, referred to as non-private mail) or mail not on business (hereinafter, referred to as private mail). The knowledge base 41b is a purchase knowledge base for determining whether the email is mail related to a purchase action (hereinafter, referred to as purchase mail) or mail not related to a purchase action (hereinafter, referred to as non-purchase mail). The knowledge base 41c is a harassment knowledge base for determining whether the email is mail for harassment (hereinafter, referred to as harassment mail) or mail not for harassment (hereinafter, referred to as non-harassment mail).

Since the purchase action is subdivided into estimation, order, payment, and so on, knowledge bases for the subdivided elements may be provided. Since the harassment is also subdivided into sexual harassment, power harassment, stalking and so on, knowledge bases for the subdivided elements may be provided. Furthermore, the kinds of knowledge base such as the non-private/private knowledge base, purchase knowledge base, and harassment knowledge base are merely examples for the embodiment to be described later, and other kinds of knowledge base may be provided.

The schedule-information storage section 25 stores schedule information on the schedule for executing the mail inspection program 23 and so on. The execution schedule may include designation of date, such as every day, every week, and every month, and designation of week or specific date. The personal-information storage section 26 stores the private information of the users who send emails from the clients 10*a*, 10*b*, and 10*c*. The sort-result storage section 27 stores email sort results by the mail inspection program 23. The sort results stored in the sort-result storage section 27 are referred to in order that an inspector executes necessary adjustment or necessary measures. Accordingly, when the sort results stored in the sort-result storage section 27 are updated, the inspector may be automatically informed of the update.

While FIG. 1 shows a structure in which emails accumulated in the journal DB 22 are inspected after the event or regularly, the mail inspection may be executed in real time at the transmission of email. In this case, for example, the mail inspection may be executed by a communication device provided between the clients 10*a*, 10*b*, and 10*c* and the mail server 20. Alternatively, the mail inspection may be executed by the clients 10*a*, 10*b*, and 10*c* at the transmission of email. In the case where email inspection is executed in real time, there is no need to store the execution schedule in the schedule-information storage section 25.

Figure 2:
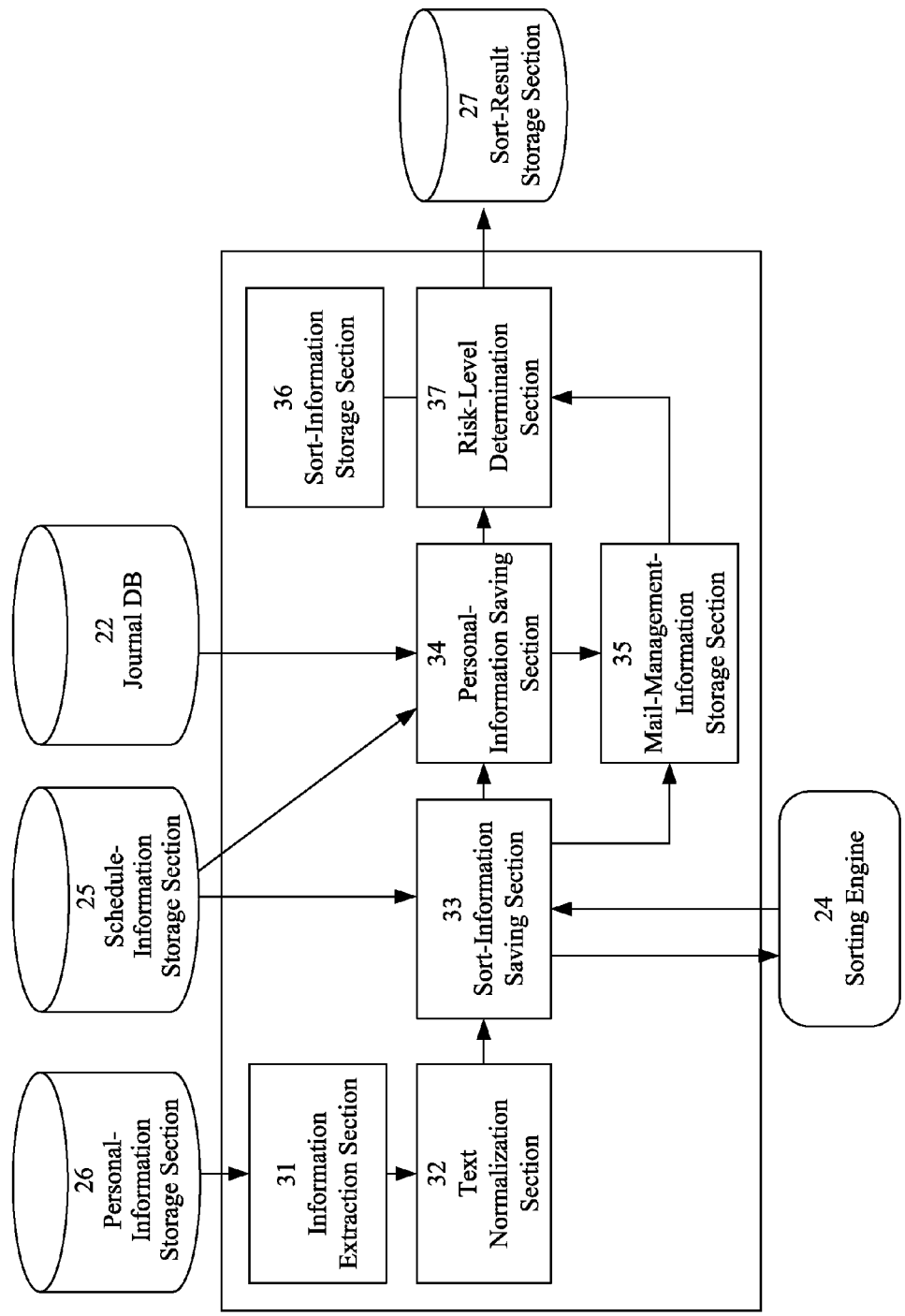
FIG. 2 is a block diagram of an example of the functional structure of a mail inspection unit of the embodiment of the invention.

Of the components of the mail server 20 shown in FIG. 1, the mail inspection program 23 will be described. FIG. 2 assumes that the mail inspection program 23 is executed by a single unit, and shows an example of the functional structure of a mail inspection unit 30. As shown in the drawing, the mail inspection unit 30 includes an information extraction section 31, a text normalization section 32, a sort-information saving section 33, a personal-information saving section 34, a mail-management-information storage section 35, a category-information storage section 36, and a risk-level determination section 37.

The information extraction section 31 extracts text part (mail content) and a mail address from the emails accumulated in the journal DB 22. The text normalization section 32 recognizes fluctuation of description and synonyms of the text part of the email extracted by the information extraction section 31, and removes the punctuation or unifies the synonyms into one. In other words, the text normalization section 32 generates normalized text that can be sorted by the sorting engine 24. In this case, the text normalization section 32 is disposed in the mail inspection unit 30; instead, it may be disposed in the sorting engine 24 from the viewpoint of processing.

The sort-information saving section 33 generates sort information indicative of whether the text part of email meets a set of sort criteria determined according to individual purpose of sorting, and saves it in the mail-management-information storage section 35. Examples of the purpose of sorting include the detection of a breach of purchase compliance and the detection of harassment. Examples of sort criteria according to the purpose of sorting include, for a breach of purchase compliance, a criterion on whether non-private mail or private mail and a criterion on whether purchase mail or non-purchase mail, and for harassment, a criterion on whether non-private mail or private mail and a criterion on whether harassment mail or non-harassment mail. In this embodiment, the sort-information saving section 33 is provided as an example of a first acquisition section for acquiring information on the characteristics of email content.

The personal-information saving section 34 extracts necessary personal information according to individual purpose of sorting, and saves it additionally in the mail-management-information storage section 35. For example, for a breach of purchase compliance, whether the email is sent from an authorized user comes into question. Therefore, information on the department is extracted and saved. For harassment, the position in the workplace and the distinction of gender come into question. Therefore, information on the position and the distinction of gender are extracted and saved. In this embodiment, the personal-information saving section 34 is provided as an example of a second acquisition section for acquiring information on the characteristics of at least one of the sender or the addressee of the email.

The mail-management-information storage section 35 stores mail management information in which sort information generated by the sort-information saving section 33 and personal information extracted by the personal-information saving section 34 are associated with email. The category-information storage section 36 stores category information on the categories into which email is sorted. In this case, the categories are set by the number of combination patterns for individual sort criteria. For example, if there are three sort criteria, the number of categories is 8 ($=2^3$), because there are two categories for one criterion. If there are four sort criteria, the number of categories is 16 ($=2^4$), because there are two categories for one criterion. Measures for the risks indicated by the categories are set to "immediate inspection", "warning", and "no problem".

The risk-level determination section 37 determines in which category each email is sorted by comparing the mail management information stored in the mail-management-information storage section 35 with the category information stored in the category-information storage section 36, and outputs the sort results to the sort-result storage section 27. In this embodiment, the risk-level determination section 37 is provided as an example of a determination section for determining whether the email message has the inspection characteristic, as an example of a sorting section for sorting email to any of the categories, and an example of a saving section for saving information according to the category into which the email is sorted.

While FIG. 2 shows a structure for post or regular mail inspection of emails accumulated in the journal DB 22, such mail inspection may be performed in real time when email is sent. In this case, for example, the emails sent from the clients 10*a*, 10*b*, and 10*c* to the mail server 20 are input directly to the information extraction section 31. In the case of real-time mail inspection, there is no need to store the execution schedule in the schedule-information storage section 25.

The operation of the mail inspection unit 30 shown in FIG. 2 will be specifically described. In the mail inspection unit 30, first, the information extraction section 31 reads emails accumulated in the journal DB 22. At that time, for example, it may read out emails accumulated after the previous inspection. The information extraction section 31 then extracts text part (mail content) and mail addresses from the read emails, and transfers the extracted information to the text normalization section 32. The text normalization section 32 normalizes the text part of the transferred information. For example, the text normalization section 32 removes the fluctuation of the description of the text and, if synonyms are described in different words, they are unified to one word. After the processing, the text normalization section 32 moves the control to the sort-information saving section 33.

The operations of the sort-information saving section 33 and the personal-information saving section 34 will be described in detail. Here, the above-described breach of purchase compliance and harassment are taken as examples of corporate risks, and such corporate risks are detected from email.

FIG. 3 shows examples of the risks and measures for the risks. FIG. 3a shows an example of measures for the risk of a breach of purchase compliance. For the breach of purchase compliance, there are subdivided sort criteria (sort criteria for mail content) including a criterion on whether non-private mail or private mail and a criterion on whether purchase mail or non-purchase mail. The purchase mail includes estimation mail and order mail, as in the drawing. Therefore, the criterion on whether purchase mail or non-purchase mail may be subdivided into the criterion on whether estimate mail or not or whether order mail or not. An example of sort criteria for personal information is a criterion on whether the email is sent from a purchase department or not.

Measures against the breach of purchase compliance are as follows: Non-private and purchase mail sent from a purchase department is proper and has no problem. However, non-private and purchase mail sent from other than a purchase department has the problem of a breach of authorized purchase (breach of compliance), so that immediate inspection is required. Private and purchase mail has a problem because it is a private purchase action using a company mail ID irrespective of the sender and may dent the company's image according to the content and circumstance of the purchase. In this case, immediate inspection is required. On the other hand, private and non-purchase mail is an ethical issue against corporate rules irrespective of the sender, so that warning is required.

FIG. 3b shows an example of measures for the risk of harassment. For the harassment, there are subdivided sort criteria (sort criteria for mail content) including a criterion on whether non-private mail or private mail and a criterion on whether harassment mail or non-harassment mail. The harassment mail includes mail containing indecency, blackmail, threat, and sexual words, as in the drawing. Therefore, the criterion on whether harassment mail or non-harassment mail may be subdivided into a criterion on whether indecency mail or not, whether blackmail or not, whether threat mail or not, and whether the mail contains sexual words or not. Examples of the sort criteria for personal information are a criterion on whether the sender is higher in position than the addressee and a criterion on whether the sender and the addressee are different in gender.

Measures against harassment are as follows: Non-private and harassment mail sent from a sender whose position is higher than the addressee can be power harassment irrespective of the gender, so that immediate inspection is required. Non-private and harassment mail sent from a person different in gender from the addressee has the possibility of sexual harassment mail or stalking mail, so that immediate inspection is required. Non-private and harassment mail other than the above has the problem of morals, so that warning is required. Private and harassment mail has the problem of morals irrespective of the position and gender, so that warning is required. On the other hand, private and non-harassment mail has the problem of ethics against corporate rules irrespective of the position and gender, so that warning is required.

In one embodiment, the sort criteria for mail content can be subdivided, as shown in FIG. 3. Many reasons exist for this subdividing. For example, subdividing email under complicated conditions requires supervisor mail that meets the complicated conditions. However, if the sort criteria are not subdivided, it is difficult to provide such supervisor mail. In contrast, if the sort criteria are subdivided as in the embodiment, there is no need for supervisor mail to completely meet the complicated conditions. Therefore, various patterns of supervisor mail can easily be prepared. For example, for extraction of business order mail, it may be difficult to prepare supervisor mail that satisfies two conditions of business and order. However, if email is divided into business mail and order mail, supervisor mail can be prepared relatively easily, because they are ordinary mail.

Additionally, if sort criteria are not subdivided, email is forcedly sorted into one of predetermined categories according to the score calculated by comparison with supervisor mail. Therefore, there is a high probability that a correct sort result cannot be obtained with complicated conditions. In contrast, if sort criteria are subdivided as in the embodiment, there is a low probability of an incorrect result, because email is sorted by simple category and then a final sort result is obtained, so that there is a low probability of an incorrect sort result. For example, for extraction of business order mail, email sort conditions can be simplified by executing sorting on business/private mail and sorting on estimate/order mail using different knowledge bases, thus offering high recognition rate.

Furthermore, information used in sort-information saving section 33 and the personal-information saving section 34 will be described. FIG. 4 shows examples of schedule information stored in the schedule-information storage section 25 of FIG. 1. The schedule information is used in the sort-information saving section 33 and the personal-information saving section 34. As shown in the drawing, the schedule information includes information on a sender to be particularly inspected, information on inspection timing, information on knowledge bases for sorting, and the kind of personal information for sorting, which are associated with one another for each purpose of email sorting.

Since the embodiment uses a breach of purchase compliance and harassment by way of example, detection of the two is set as the purpose of sorting. As the sender to be inspected with particular emphasis for this purpose, "black list" and "purchase" are listed. Here, "black list" means a user who is set as a suspicious person by the process of the risk-level determination section 37, to be described later. "Purchase" means a purchase department which is an example of organizations that are strict about email transmission. Setting them as sender information allows email from such senders to be inspected for all risks every day. As the timing, "Daily" is set for "To detect breach of purchase compliance", while "Weekly" is set for "To detect harassment" ("Monthly" may be set"). This is for setting the timing to inspect email sent from other than the above sender. That is, risks with high urgency such as "breach of purchase compliance" are inspected every day, while risks with relatively low urgency are inspected weekly (or monthly).

Furthermore, "to detect breach of purchase compliance", a non-private/private knowledge base and a purchase knowledge base are used, and information on the department of the sender is defined as personal information. "To detect harassment", a non-private/private knowledge base and a harassment knowledge base are used, and information on the positions of the sender and the addressee and the distinction of gender of the sender and the addressee are defined as personal information.

FIG. 5 shows examples of personal information stored in the personal-information storage section 26 of FIG. 1. The personal information is used in the personal-information saving section 34. As shown in the drawing, the personal information includes a mail address, and the department, position, gender, warning quantity, and a black list flag (in the drawing, a black list) of a user corresponding to the address, which are associated with one another.

Of the information, the mail address, department, position, and gender are generally managed as personal information, so that their descriptions are omitted. The warning quantity indicates the quantity of warning determined by the risk-level determination section 37, to be described later, in a fixed period. FIG. 5 shows only the quantity, but the personal-information storage section 26 stores information on the transmission date of email for which determination of "warning" is given, and "1" is subtracted from the warning quantity after a lapse of a fixed period from the transmission date. The black list flag is set according to the result of determination made by the risk-level determination section 37, to be described later. Specifically, if a determination of "immediate inspection" is given by the risk-level determination section 37 or if a determination of "warning" by the risk-level determination section 37 exceeds a predetermined value in a fixed period, the flag is set to "ON". The warning quantity and the black list flag are examples of information on the category of email sorting.

Figure 6:
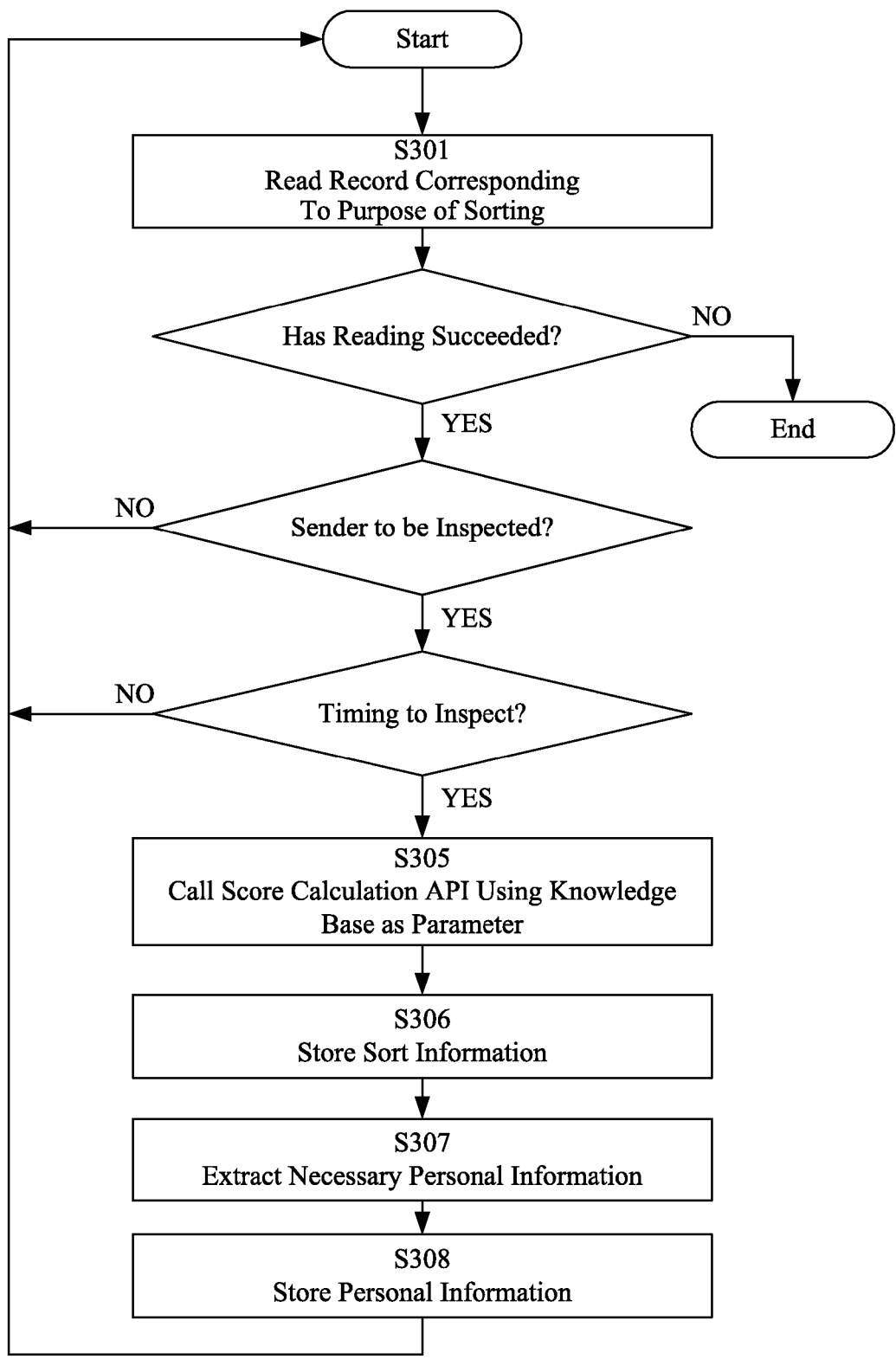
FIG. 6 is a flowchart for the operations of a sort-information saving section and a personal-information saving section of the embodiment of the invention.

The operations of the sort-information saving section 33 and the personal-information saving section 34 will be described on the assumption that the schedule-information storage section 25 stores schedule information and the personal-information storage section 26 stores personal information. FIG. 6 is a flowchart for the operations of the sort-information saving section 33 and the personal-information saving section 34. The sort-information saving section 33 first reads a record corresponding to one purpose of sorting from the schedule information stored in the schedule-information storage section 25 (step S301), and determines whether the reading has succeeded (step S302). If the reading has failed, that is, if there is no record to be read, the process ends.

If the reading has succeeded, the sort-information saving section 33 determines whether the sender corresponding to the mail address extracted by the information extraction section 31 is a sender to be inspected this time (step S303). Specifically, the sort-information saving section 33 searches the personal information stored in the personal-information storage section 26 using the mail address extracted in step S303 as a key, and refers to the department and the black list flag of the user of the mail address. If the department is "purchase", or if the black list flag is "ON", the sort-information saving section 33 determines that the sender is to be inspected this time.

If it is determined that the sender corresponding to the mail address is to be inspected this time, the sort-information saving section 33 determines whether the present date is the timing of inspection (step S304). Specifically, the sort-information saving section 33 determines whether the present date is the date of inspection determined according to the timing contained in the record read in step S301. For example, if the timing is "Daily" in the case where the process of FIG. 6 is activated every day, it is determined that the present date is the date of inspection. If the timing is "Weekly" in the case where the process of FIG. 6 is activated every day, it is determined that the present date is the date of inspection only when the present day of week is the day of week of inspection.

If it is determined that the present date is the date of inspection, the sort-information saving section 33 calls a score calculation API using the knowledge base contained in the record read in step S301 as parameters (step S305). Thus, the score calculation API calculates the likelihood of the characteristics of the content of the email using the indicated knowledge base, and returns it to the sort-information saving section 33. For example, a purchase knowledge base is indicated, the score calculation API returns the information that the likelihood of purchase mail is "X %", and the likelihood of non-purchase mail is "Y %".

FIG. 7 shows examples of the case in which whether email is purchase mail or non-purchase mail is indicated by a likelihood score. In FIG. 7, for the titles of email, the likelihood of purchase mail is indicated by "Purchase", and the likelihood of non-purchase mail is indicated by "NoPurchase". To calculate such likelihood scores, the sorting engine 24 learns in the first learning process. That is, the sorting engine 24 obtains statistical information of a large amount of characteristic words from learning date containing purchase mail and non-purchase mail, and generates functions (API) for calculating the score of likelihood (probability) of purchase mail and the likelihood (probability) of non-purchase mail, that is, determines the optimum parameters of variables. For example, the information of the frequency of appearance of characteristic words in purchase mail and the information of the frequency of appearance of characteristic words in non-purchase mail are determined as parameters, and the created functions (API) are accumulated in the knowledge base. Thus, when an instruction to calculate the score of new email is given from the sort-information saving section 33, the sorting engine 24 calculates the score using the functions (API) accumulated in the knowledge base.

When the score is returned from the sorting engine 24, the sort-information saving section 33 determines whether the email satisfies the sort criteria corresponding to the knowledge bases, and stores sort information indicative of the determination results in the mail-management-information storage section 35 (step S306). Then, the personal-information saving section 34 extracts personal information of the kinds contained in the record read in step S301 from the personal information stored in the personal-information storage section 26 (step S307). Specifically, the personal-information saving section 34 extracts, of the department, position, and gender corresponding to the mail address extracted by the information extraction section 31, information of the kinds contained in the record read in step S301 and stores the extracted personal information into the mail-management-information storage section 35 (step S308).

In this embodiment, email inspection is executed according to the schedule information stored in the schedule-information storage section 25. This is because the priority and so on depend on the purpose of sorting. However, such inspection date customizing function is not always necessary. In this embodiment, the schedule information stored in the schedule-information storage section 25 includes information on the kind of the knowledge bases used in the sorting engine 24 and the kind of personal information to be extracted from the personal-information storage section 26. As an alternative, such information may not be included in the schedule information. For example, it is possible that when a sort purpose such as "breach of purchase compliance" or "harassment" is given, the sorting engine 24 may determine which knowledge base is to be used, and calculate the score using the knowledge base.

The content of the information stored in the mail-management-information storage section 35 by the sort-information saving section 33 and the personal-information saving section 34 will be described. FIG. 8 is a diagram of an example of mail management information stored in the mail-management-information storage section 35. As shown in the drawing, the information stored in the mail-management-information storage section 35 includes a mail ID, sort information, sender information, and addressee information in association. The mail ID is information for identifying email uniquely; for example, it may be user identifying information to which consecutive numbers are added. The sort information is information indicative of whether the mail content satisfies the sort criteria. Here, the sort criteria are whether non-private mail or private mail, whether purchase mail or non-purchase mail, and whether harassment mail or non-harassment mail. Thus, the mail-management-information storage section 35 stores the type of the email for each criterion.

The sender information and the addressee information each include information on department, position, and gender. "Unsaved" indicates that no personal information is saved in the personal-information storage section 26 because it is an external mail address. Here, detection of a breach of purchase compliance and harassment is taken as an example, so that only the minimum personal information required for the detection is stored. However, which personal information is used and how it is used for email sorting depend on the company's way of thinking about risk. Accordingly, the personal-information storage section 26 may store personal information whose necessity is not unknown at that time.

Thereafter, the risk-level determination section 37 determines the risk level according to the information stored in the mail-management-information storage section 35, and sorts the email. The category information used for determination of risk level by the risk-level determination section 37 will be described. FIG. 9 shows examples of the category information stored in the category-information storage section 36. FIG. 9a shows an example of category information that is referred to in order to determine the risk level about a breach of purchase compliance. As shown in the drawing, the measures shown in FIG. 3 are stored for each of combinations of information on whether private mail or not, whether purchase mail or not, and whether the mail is sent from a purchase department staff. Here, conditions regarding authorized purchase are set; instead, conditions regarding another authority may be set. That is, email in breach of a specific authorized action may be detected using conditions regarding the authority of the sender for the specific action.

FIG. 9b shows an example of sort information that is referred to in order to determine the risk level of harassment. As shown in the drawing, the measures shown in FIG. 3 are stored for each of combinations of information on whether private mail or not, whether harassment mail or not, and whether the position of the sender is higher than that of the addressee, and whether the sender is different in gender from the addressee. Here, conditions regarding the position and gender of the sender and the addressee are set; instead, conditions regarding other attributes may be set. That is, email for action using a relation with another person may be detected using conditions regarding the relationship between the sender and the addressee.

The operation of the risk-level determination section 37 will be specifically described on the assumption that mail management information is stored in the mail-management-information storage section 35 and category information is stored in the category-information storage section 36.

Figure 10:
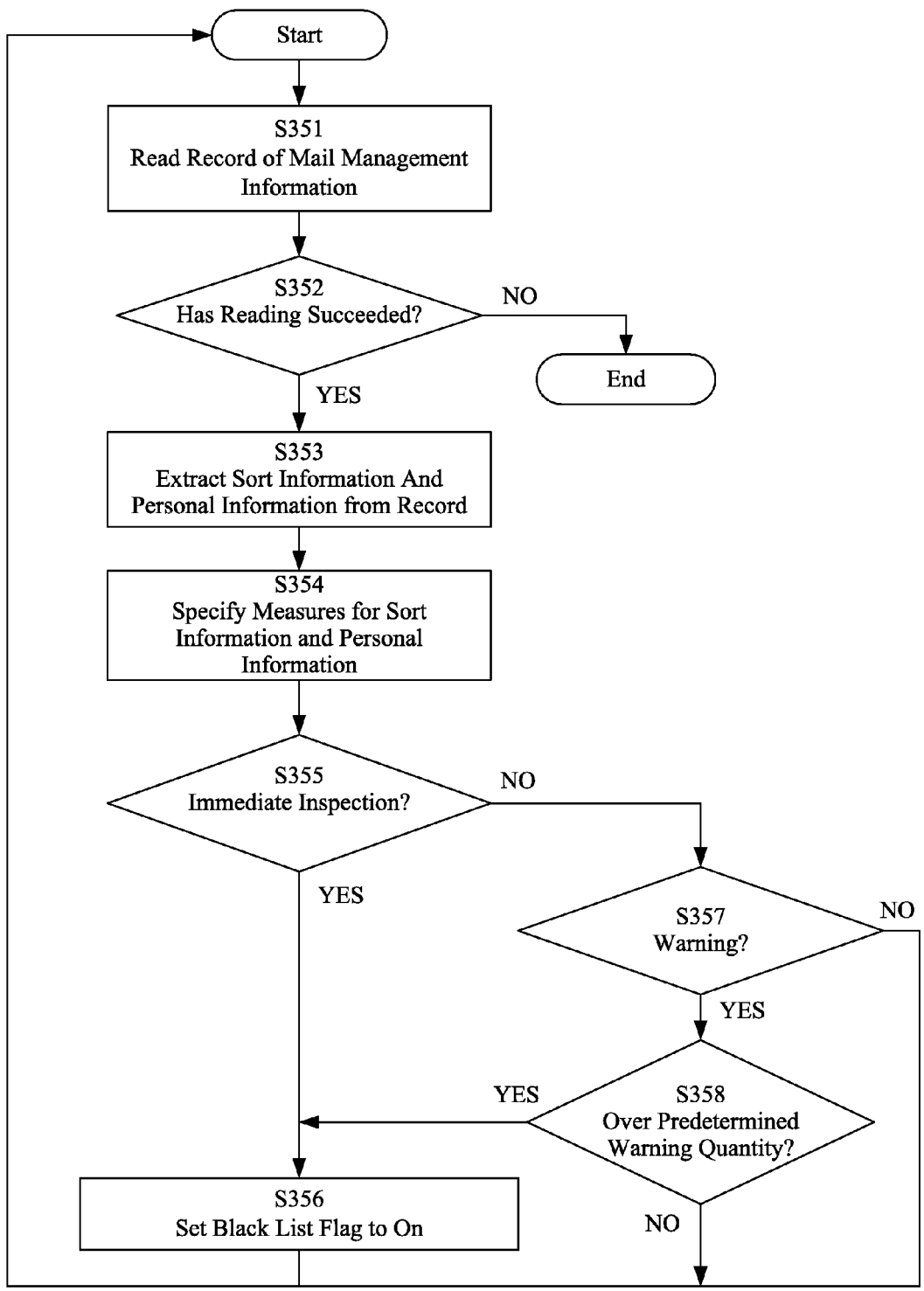
FIG. 10 is a flowchart of an example of the operation of a risk-level determination section according to the embodiment of the invention.

FIG. 10 is a flowchart of an example of the operation of the risk-level determination section 37. The risk-level determination section 37 first reads one record from the mail management information stored in the mail-management-information storage section 35 (step S351), and determines whether the reading has succeeded (step S352). If the reading has failed, that is, if there is no record to be read, the process ends. If the reading has succeeded, the risk-level determination section 37 extracts the category information and the personal information contained in the read record (step S353). The risk-level determination section 37 refers to the category information stored in the category-information storage section 36, and specifies measures for the category information and personal information extracted in step S353 (step S354).

For example, for the mail of mail ID "aaaaa000336699", sort information indicative that the mail content is "non-private" and "purchase" is stored. Accordingly, in the category information, lines in which the private mail is "NA" and the purchase mail is "A" are referred to. Furthermore, sender information indicative that the department is "purchase" is stored. Accordingly, in the category information, lines in which the purchase staff is "A" are referred to. As a result, the fifth line of the category information of FIG. 9a is referred to, so that "no problem" is extracted as the measure.

For the mail of mail ID "ccccc001020305", sort information indicative that the mail content is "non-private" and "harassment" is stored. Accordingly, in the category information, lines in which the private mail is "NA" and the harassment mail is "A" are referred to. Furthermore, sender information indicative that the position is "manager" and the gender is "male" is stored, and addressee information indicative that the position is "regular employee", and the "sex" is "male" is stored. Accordingly, lines in which "sender position>addressee position" is "A" and "sender sex≠addressee sex" is "NA" are referred to. As a result, the tenth line of the category information of FIG. 9b is referred to, so that "immediate inspection" is extracted as the measure.

After that, the risk-level determination section 37 executes the process for managing the risk level of each user. The process for customizing risk level, to be described later, is an addition function to the embodiment, and is not absolutely necessary. In achieving the additional function, the risk-level determination section 37 determines whether the measure is "immediate inspection" (step S355). Here, if the determination is "immediate inspection", then the black list flag in the personal-information storage section 26 is set to "ON" which indicates that the user who has the mail address is a suspicious person (step S356).

If the determination is not "immediate inspection", then it is determined whether the measure is "warning" (step S357). If the determination is "warning", then the risk-level determination section 37 determines whether the warning quantity during a fixed period has exceeded a predetermined quantity (step S358). If the warning quantity during a fixed period has exceeded a predetermined number, then the risk-level determination section 37 sets the black list flag in the personal-information storage section 26 to "ON" indicative that the user having the mail address is a suspicious person (step S356). If the measure is not "warning" in step S357, or if the warning quantity has not exceeded a predetermined quantity, the risk-level determination section 37 returns to step S351 without executing the process for the black list.

In this embodiment, the saving of mail management information by the sort-information saving section 33 and the personal-information saving section 34 and the detection of the characteristics of email according to mail management information are executed asynchronously. This is because in the case of sorting email under additional conditions, email can be sorted by reusing the processing results and adding only the conditions that have not been used for sorting. Thus, combining with sort results facilitates new sorting. This applies also to sorting under partly changed conditions, without adding new conditions.

This embodiment may have the following additional function: Examples of the additional functions include the function of indicating the risk level of the content to be inspected between a specific sender and addressee, the function of extracting a user related to a specific risk (extracting the category) and indicating it, and the function of indicating the correlation between a specific risk and personal information (department, post, etc.).

Figure 11:
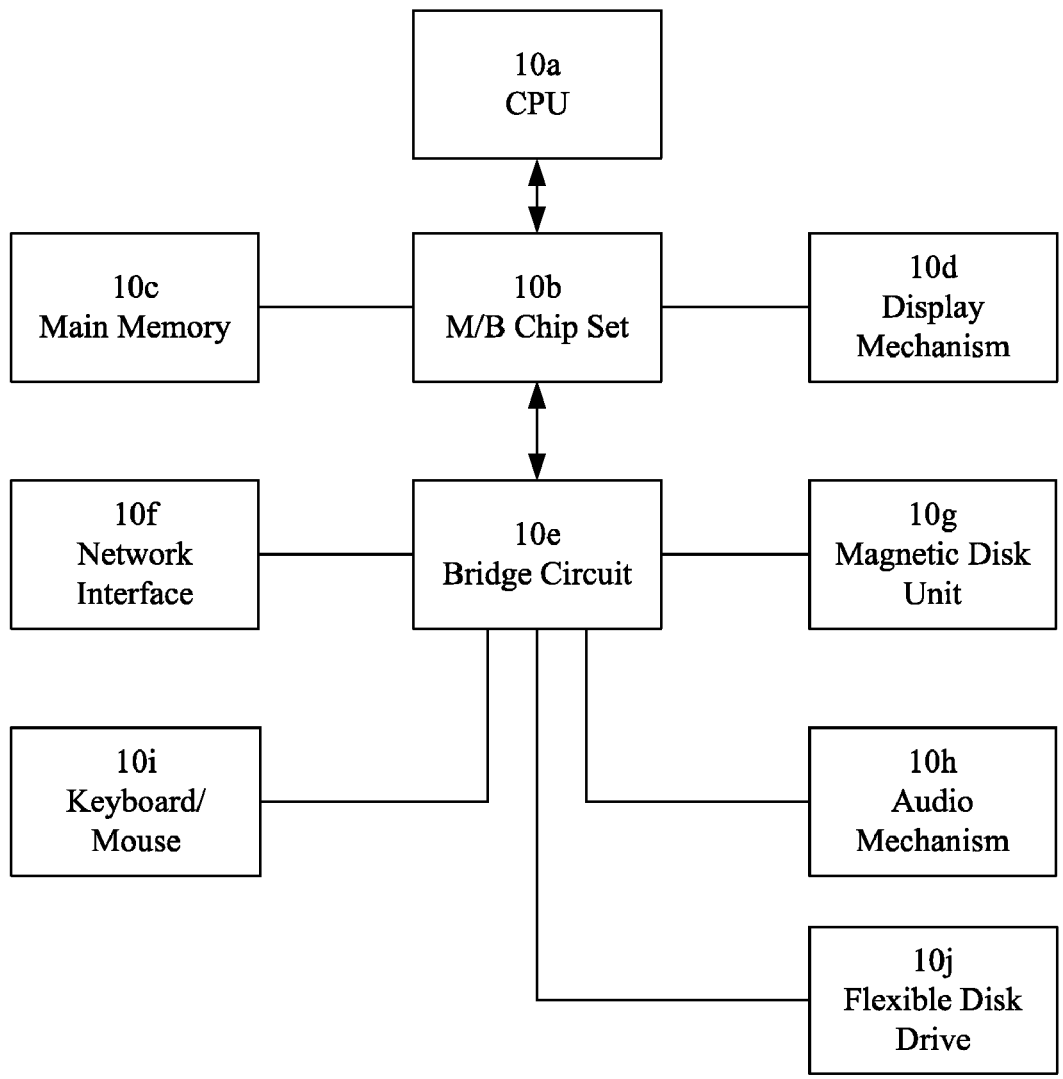
FIG. 11 is a block diagram of the hardware configuration of the computer incorporating the embodiment of the invention.

Finally, the hardware configuration of a computer suitable for application of the embodiment will be described. FIG. 11 is a block diagram of an example of the hardware configuration of the computer. As shown in the drawing, the computer includes a central processing unit (CPU) 10a serving as operating means, a main memory 10c connected to the CPU 10a via a motherboard (M/B) chip set 10b, and a display mechanism 10d which is also connected to the CPU 10a via the M/B chip set 10b. The M/B chip set 10b connects to a network interface 10f, a magnetic disk unit (HDD) 10g, an audio mechanism 10h, a keyboard/mouse 10i, and a flexible disk drive 10j via a bridge circuit 10e.

In FIG. 11, the components are connected together via a bus. For example, between the CPU 10a and the M/B chip set 10b and between the M/B chip set 10b and the main memory 10c are connected via a CPU bus. Between the M/B chip set 10b and the display mechanism 10d be connected via an accelerated graphic port (AGP); however, in the case where the display mechanism 10d includes a PCI Express video card, the M/B chip set 10b and the video card are connected via a PCI Express (PCIe) bus. For connection with the bridge circuit 10e, for example, PCI express can be used for the network interface 10f. For the magnetic disk unit 10g, for example, serial AT attachment (ATA), parallel ATA, or a peripheral components interconnect (PCI) can be used. For the keyboard/mouse 10i and the flexible disk drive 10j, a universal serial bus (USB) can be used.

The invention may be achieved entirely by hardware or software or by both of hardware and software. The invention can be achieved as a computer, a data processing system, and a computer program. The computer program can be provided via a computer-readable medium. Here, examples of the medium include an electronic, magnetic, optical, electromagnetic, infrared, or semiconductor system (unit or apparatus) or transmission medium. Examples of the computer-readable medium are semiconductor solid-state storage devices, magnetic tape, removable computer diskettes, random access memories (RAMs), read-only memories (ROMs), rigid magnetic disks, and optical disks. Examples of the magnetic disks at the present time are compact disc read-only memories (CD-ROMs), compact disc read/write memories (CD-R/Ws), and DVDs.

In this embodiment, information on the sender and the addressee of email is used to sort email on a level with information on mail content. This allows more accurate sorting than with conventional ones.

While the invention has been described in its one embodiment, it is to be understood that the invention is not limited to those, and various modifications may be made without departing from the spirit and scope of the invention.

What is claimed is:

1. A computer program product having computer usable program code for detecting an inspection characteristic in an electronic mail message, the computer program product comprising:

computer usable program code stored in at least one storage medium for acquiring first characteristic information on the content of the electronic mail message according to the text information of the electronic mail message, wherein the first characteristic information categorizes the content of the electronic mail message in accordance with a plurality of different categories, each of the different categories representing a possible breach of legal or corporate rules per a corporate policy, wherein the plurality of different categories comprise at least one of a purchase mail category, and a harassment mail category, wherein a different inspection characteristic is provided for each of the different categories for the electronic mail message;

computer usable program code stored in at least one storage medium for acquiring second characteristic information on at least one corporate electronic mail user that comprises at least one of the sender and the addressee of the electronic mail message according to the address information of the electronic mail message wherein the second characteristic information is acquired from a corporate data store that maintains personnel information about the at least one corporate email user and wherein said second characteristic information is not contained within the electronic mail message itself; and computer usable program code stored in at least one storage medium for associating the first characteristic information acquired by the first acquisition section and the second characteristic information acquired by the second acquisition section with the electronic mail message to determine whether the corporate policy has been violated or not by the electronic mail message, wherein the determining is based on a combination of the content of the email message and personnel information about the at least one corporate email user, wherein the purchase mail category is for purchasing goods and services, wherein the content of the electronic mail message is used to determine that the goods or services are being purchased, and wherein a purchasing authority of the sender is a factor in determining whether one of the corporate policies has been violated, wherein the harassment mail category is for electronic mail messages containing semantic content considered to be workplace harassment by the corporate policy, wherein both the sender and a recipient of the electronic message are employees of the company, and wherein a severity or existence of harassment is dependent upon a workplace relationship between the sender and the addressee, as specified within the second characteristic information.

2. The computer usable program according to claim 1, further comprising computer usable program code for determining whether the electronic mail message has the inspection characteristic that indicates compliance or non-compliance with the corporate policy by comparing the first characteristic information associated with the electronic mail message by the association with a first condition for determining whether the electronic mail message has the inspection characteristic and by comparing the second characteristic information associated with the electronic mail message by the association with a second condition for determining whether the electronic mail message has the inspection characteristic, wherein content of an electronic email message is evaluated different for purposes of determining the inspection characteristic dependent upon the personnel information utilized.

3. The computer usable program according to claim 2, wherein the determination section determines whether the electronic mail message has the inspection characteristic asynchronously with the association of the first characteristic information and the second characteristic information with the electronic mail message.

4. The computer usable program according to claim 2, wherein one of the different categories is a private mail category for electronic mail messages conducted during business hours using the corporate electronic mail address for non-corporate purposes in violation of the corporate policies, wherein a determination of whether the corporate policy is violated is dependent upon both the personnel information from the corporate datastore and the content.

5. The computer usable program according to claim 2, wherein one of the different categories is the purchase mail category for electronic mail messages for purchasing goods and services, wherein the content of the electronic mail message is used to determine that the goods or services are being purchased, as indicated by the first characteristic information, and wherein a purchasing authority of the sender is indicated within the second characteristic information, wherein the inspection characteristic indicates whether the corporate policy has been violated given the first characteristic information in light of the second characteristic information.

6. The computer usable program according to claim 2 wherein one of the different categories is the harassment mail category.

7. The computer usable program according to claim 1, wherein the plurality of different categories comprise the purchase mail category and the harassment mail category.

8. The computer program product of claim 1, wherein the plurality of different categories comprise a private mail category, the purchase mail category, and the harassment mail category.

9. A method for handling electronic mail comprising:
analyzing, via at least one processor executing computer program code that is stored on at least one storage medium, an outgoing email message from a corporate email account of a company to characterize content of the outgoing email message into one of a plurality of different previously defined categories, wherein the plurality of previously defined categories include a purchase mail category, wherein the purchase mail category is for purchasing goods and services, wherein the content of the electronic mail message is used to determine that the goods or services are being purchased, and wherein a purchasing authority of the sender is a factor in determining whether one of the corporate policies has been violated;
if the outgoing mail message falls into the purchase mail category determining, via at least one processor executing computer program code that is stored on at least one storage medium, whether the outgoing mail violates a corporate policy of the company, wherein different corporate policies are checked depending on whether the outgoing mail message is in the purchase mail category;
if no corporate policy of the company is violated, sending, via at least one processor executing computer program code that is stored on at least one storage medium, the outgoing message to the intended recipient and taking no adverse actions related to a sender of the outgoing email message, where the sender is a designated user of the corporate email account;
if one or more corporate policies has been violated by the outgoing email message, determining, via at least one processor executing computer program code that is stored on at least one storage medium, at least one of a plurality of different measures to be taken in responsive to the violation, wherein the different measures comprise at least one of issuing a warning to the sender and flagging the outgoing message for inspection by a company employee other than the sender, where the company employee is responsible for enforcing the corporate policies; and
taking, via at least one processor executing computer program code that is stored on at least one storage medium, the determined measure in response to the violation, wherein when a warning is issued, a warning count associated with the sender and the incident is maintained in a corporate data base, wherein harsher measures are taken by the company for infringement of corporate policy once a warning count of the sender exceeds a previously established threshold.

10. The method according to claim 9, further comprising:
detecting inspection characteristics when analyzing the outgoing email message; and
sorting, via at least one processor executing computer program code that is stored on at least one storage medium, the outgoing email message into at least one of the plurality of different previously defined categories which are predetermined for the inspection characteristics.

11. The method according to claim 9, wherein one of the different categories is a harassment mail category for electronic mail messages containing semantic content considered to be workplace harassment by the corporate policy, wherein both the sender and a recipient of the electronic message are employees of the company, and wherein a severity or existence of harassment is dependent upon a workplace relationship between the sender and the addressee, as specified within the second characteristic information.

12. The method according to claim 9, wherein one of the different categories is a private mail category for electronic mail messages conducted during business hours using the corporate email account for non-corporate purposes in violation of the corporate policies.

13. The method of claim 9, wherein the plurality of previously defined categories include a harassment mail category, and a private mail category, and wherein in the determining step comprises:
if the outgoing mail message falls into the purchase mail category, the harassment mail category or the private mail category, determining, via at least one processor executing computer program code that is stored on at least one storage medium, whether the outgoing mail violates a corporate policy of the company, wherein different corporate policies are checked depending on whether the outgoing mail message is in the purchase mail category, the harassment mail category, or the private mail category.

14. A method for handling electronic mail comprising:
analyzing, via at least one processor executing computer program code that is stored on at least one storage medium, an outgoing email message from a corporate email account of a company to characterize content of the outgoing email message into one of a plurality of different previously defined categories, wherein the plurality of previously defined categories include a harassment mail category, wherein the harassment mail category is for electronic mail messages containing semantic content considered to be workplace harassment by the corporate policy, wherein both the sender and a recipient of the electronic message are employees of the company, and wherein a severity or existence of harassment is dependent upon a workplace relationship between the sender and the addressee, as specified within the second characteristic information;
if the outgoing mail message falls into the harassment mail category, determining, via at least one processor executing computer program code that is stored on at least one storage medium, whether the outgoing mail violates a corporate policy of the company, wherein different corporate policies are checked depending on whether the outgoing mail message is in the harassment mail category;
if no corporate policy of the company is violated, sending, via at least one processor executing computer program code that is stored on at least one storage medium, the outgoing message to the intended recipient and taking no adverse actions related to a sender of the outgoing email message, where the sender is a designated user of the corporate email account;
if one or more corporate policies has been violated by the outgoing email message, determining, via at least one processor executing computer program code that is stored on at least one storage medium, at least one of a plurality of different measures to be taken in responsive to the violation, wherein the different measures comprise at least one of issuing a warning to the sender and flagging the outgoing message for inspection by a company employee other than the sender, where the company employee is responsible for enforcing the corporate policies; and
taking, via at least one processor executing computer program code that is stored on at least one storage medium, the determined measure in response to the violation, wherein when a warning is issued, a warning count associated with the sender and the incident is maintained in a corporate data base, wherein harsher measures are taken by the company for infringement of corporate policy once a warning count of the sender exceeds a previously established threshold.

15. The method according to claim 14, further comprising:
detecting inspection characteristics when analyzing the outgoing email message; and
sorting, via at least one processor executing computer program code that is stored on at least one storage medium, the outgoing email message into at least one of the plurality of different previously defined categories which are predetermined for the inspection characteristics.

16. The method according to claim 14, wherein one of the different categories is a private mail category for electronic mail messages conducted during business hours using the corporate email account for non-corporate purposes in violation of the corporate policies.

17. The method of claim 14, wherein the plurality of previously defined categories include a purchase mail category, and a private mail category, and wherein in the determining step comprises:
if the outgoing mail message falls into the purchase mail category, the harassment mail category or the private mail category, determining, via at least one processor executing computer program code that is stored on at least one storage medium, whether the outgoing mail violates a corporate policy of the company, wherein different corporate policies are checked depending on whether the outgoing mail message is in the purchase mail category, the harassment mail category, or the private mail category.

* * * * *